United States Patent
Arunachalam et al.

(10) Patent No.: US 9,208,462 B2
(45) Date of Patent: Dec. 8, 2015

(54) SYSTEM AND METHOD FOR GENERATING A MARKETING-MIX SOLUTION

(75) Inventors: Ramprasad Arunachalam, Bangalore (IN); Ambiga Dhiraj, Mercer Island, WA (US); Zubin Dowlaty, Alpharetta, GA (US)

(73) Assignee: Mu Sigma Business Solutions Pvt. Ltd., Bangalore (IN)

( * ) Notice: Subject to any disclaimer, the term of this patent is extended or adjusted under 35 U.S.C. 154(b) by 374 days.

(21) Appl. No.: 13/543,631

(22) Filed: Jul. 6, 2012

(65) Prior Publication Data
US 2013/0166351 A1 Jun. 27, 2013

(30) Foreign Application Priority Data
Dec. 21, 2011 (IN) ............... 4500/CHE/2011

(51) Int. Cl.
  *G06Q 10/00* (2012.01)
  *G06Q 30/00* (2012.01)
  *G06Q 10/06* (2012.01)
  *G06Q 30/02* (2012.01)
(52) U.S. Cl.
  CPC .......... *G06Q 10/06375* (2013.01); *G06Q 10/06* (2013.01); *G06Q 30/0201* (2013.01)
(58) Field of Classification Search
  CPC .................................. G06Q 30/0201
  USPC ............................. 705/7.11–7.42
  See application file for complete search history.

(56) References Cited

U.S. PATENT DOCUMENTS

| | | | |
|---|---|---|---|
| 6,865,567 B1* | 3/2005 | Oommen et al. | 1/1 |
| 2002/0082888 A1* | 6/2002 | Graff et al. | 705/7 |
| 2007/0106550 A1* | 5/2007 | Umblijs et al. | 705/10 |
| 2008/0228560 A1* | 9/2008 | Mack et al. | 705/10 |
| 2010/0010878 A1* | 1/2010 | Pinto et al. | 705/10 |
| 2010/0332311 A1* | 12/2010 | Jilk | 705/14.42 |
| 2011/0054860 A1* | 3/2011 | Guild et al. | 703/2 |
| 2011/0231245 A1* | 9/2011 | Bhatia et al. | 705/14.43 |

OTHER PUBLICATIONS

PM Cain, "Marketing Mix Modelling and Return on Investment" (2010).*

* cited by examiner

*Primary Examiner* — Sujay Koneru
(74) *Attorney, Agent, or Firm* — Harness, Dickey & Pierce (57) ABSTRACT

A method for generating a marketing-mix solution is provided. The method includes pre-modeling marketing data having a plurality of marketing-mix variables. Each of the plurality of marketing-mix variables is associated with marketing strategies for one or more products. The method also includes generating a sales and/or revenue based response model to identify contributory marketing-mix variables that affect the sales and/or revenue of the one or more products and analyzing the response model to determine individual contribution of each of the contributory marketing-mix variables towards the sales an/or revenue of the one or more products.

20 Claims, 9 Drawing Sheets

| Setup | Summary | Fitted vs. Actuals | Residuals |

Select model variables  EDA  Transformation  Modelling  Marketing mix  Import an Existing Model    | Contact Us |  | Help |

Diagnostics: Model Summary

Number of rows: 104
Periodicity: weekly
Model Rsquared is: 0.8634
Adjusted R-Square is: 0.8436
F Statistic: 43.748. Degrees of freedom in the numerator: 13,
Degrees of freedom in the denominator: 90
Durbin-Watson statistic: 1.3612
Mean Absolute Percent Error (MAPE): 0.007

Enter Model Name [          ] Save

Diagnostics: Linear Model Parameters

| Variable Name | Estimate | P Value | T Value | Standard error of the coefficient estimate | Variance Inflation factor (VIF) |
|---|---|---|---|---|---|
| (intercept) | 942340.148 | 0 | 12.173 | 2.375 | 1.682 |
| coupon_per_stor | 8.784 | 0 | 3.698 | 34.7 | 2.059 |
| direct_mail_per_ | 121.77 | 0.001 | 3.509 | 0.007 | 2.487 |
| google_impressi | 0.021 | 0.006 | 2.821 | 152.089 | 2.186 |
| tv_trps_per_store | 447.494 | 0.004 | 2.942 | 0.943 | 1.237 |
| newspaper_ads_ | 2.063 | 0.031 | 2.188 | 6067.954 | 2.403 |
| unemp_rate | -20999.534 | 0.001 | -3.461 | 22031.381 | 1.98 |
| mar_flag | 90271.465 | 0 | 4.097 | 22598.323 | 1.702 |
| apr_flag | 183212.389 | 0 | 8.107 | 20473.121 | 1.555 |
| may_flag | 153892.729 | 0 | 7.517 | 19021.214 | 1.342 |
| jun_flag | 119628.387 | 0 | 6.289 | 18331.955 | 1.12 |
| jul_flag | 138596.38 | 0 | 7.56 | 18294.21 | 1.365 |
| aug_flag | 86585.673 | 0 | 4.733 | 19096.598 | 1.215 |
| oct_flag | 52014.209 | 0.008 | 2.724 | | |

SYSTEM AND METHOD FOR GENERATING A MARKETING-MIX SOLUTION

BACKGROUND

The invention relates generally to marketing, and particularly to systems and methods for generating marketing-mix solutions.

Business enterprises spend enormous amounts of money on marketing of products. Such expenditures are often towards many different marketing channels, such as television advertisements, web advertisements, newspaper and magazine advertisements, among others. It is desirable to measure return-of-investments (ROI) on the money spent on the marketing activities to generate optimal marketing-mix solutions that maximize the sales/revenues of the products.

Typically, a marketing manager would need to perform an elaborate and time consuming analysis to figure out incremental gain in sales by increasing the respective marketing element by one unit. Additionally, the marketing manager would need to optimize the marketing budget and identify the efficient marketing activities.

Unfortunately, analyzing marketing data to determine marketing strategies is extremely complex due to difficulties in capturing and extracting data from various data sources. Furthermore, business management often requires to forecast future outcomes of the sales/revenues based upon changes in marketing strategies including variations in spends towards various marketing channels. For any given business, there are a large number of factors that influence the business outcome. Many business organizations generate forecasts through a manual process, which can be extremely cumbersome and time-consuming.

Therefore, it is desirable to develop a technique to organize, integrate and analyze marketing data to generate marketing-mix solutions for optimizing spends towards different marketing channels.

BRIEF DESCRIPTION

Briefly, according to one embodiment of the present invention, a method for generating a marketing-mix solution is provided. The method includes pre-modeling marketing data having a plurality of marketing-mix variables. Each of the plurality of marketing-mix variables is associated with marketing strategies for one or more products. The method also includes generating a sales and/or revenue based response model to identify contributory marketing-mix variables that affect the sales and/or revenue of the one or more products and analyzing the response model to determine individual contribution of each of the contributory marketing-mix variables towards the sales an/or revenue of the one or more products.

In another embodiment, a system for generating a marketing-mix solution is provided. The system includes a user interface for providing marketing data associated with marketing strategies for one or more products and memory circuitry configured to store the marketing data. The system also includes a processor configured to access the memory circuitry, wherein the processor is configured to pre-model the marketing data and to analyze pre-modeled marketing data using a sales and/or revenue based response model to identify contributory marketing-mix variables that affect the sales and/or revenue of the one or more products.

In another embodiment, a method for generating a marketing-mix solution is provided. The method includes pre-modeling marketing data having a plurality of marketing-mix variables. Each of the plurality of marketing-mix variables is associated with marketing strategies for one or more products. The method includes generating a sales and/or revenue based response model to identify contributory marketing-mix variables that affect the sales and/or revenue of the one or more products and analyzing the response model to determine individual contribution of each of the contributory marketing-mix variables towards the sales an/or revenue of the one or more products. The method further includes adjusting one or more marketing strategies in response to the individual contribution of each of the contributory marketing-mix variables.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, the embodiments of the present invention function to provide a system and method for generating a marketing-mix solution. In particular, the present technique enables pre-modeling of marketing data having a variety of marketing-mix variables that are associated with marketing strategies for one or more products and generating a sales and/or revenue based response model to identify contributory marketing-mix variables that affect the sales and/or revenue of the one or more products.

Moreover, the embodiments of the present invention provide a technique to analyze the response model to determine individual contribution of each of the contributory marketing-mix variables towards the sales an/or revenue of the one or more products. Advantageously, the marketing strategies for the one or more products is customized and/or adjusted based upon the analysis results to maximize the sales and/or revenue of the products.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
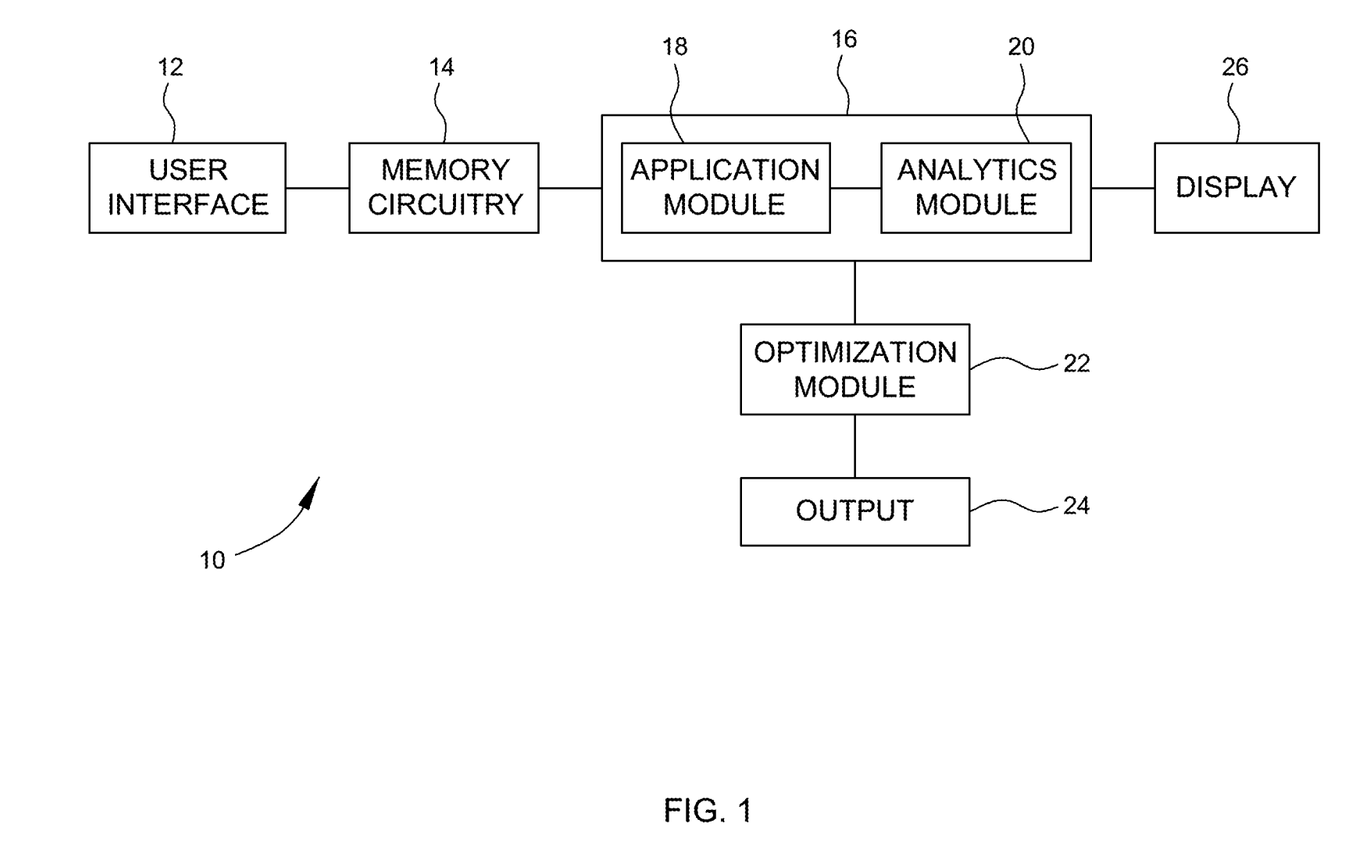
FIG. 1 is a schematic diagram of a system for generating a marketing-mix solution in accordance with aspects of the present technique.

Turning now to drawings and referring first to FIG. 1, a system 10 for generating a marketing-mix solution is provided. The system 10 includes a user interface 12 for providing marketing data associated with marketing strategies for one or more products. The marketing data includes a plurality of marketing-mix variables and each of the plurality of marketing-mix variables is associated with marketing strategies for one or more products.

Examples of the marketing-mix variables include, but are not limited to, sales data captured over a period of time for products, parameters indicating the time/season of the year, macroeconomic parameters such as total income of individuals in a selected market region and marketing variables such as number of advertisements of the products through various communication channels, number of users visiting the website of stores selling the products. It would be appreciated by those skilled in the art that a variety of such marketing-mix parameters may be envisaged.

The system 10 further includes a memory circuitry 14 for storing the marketing data. The memory circuitry 14 may include hard disk drives, optical drives, tape drives, random access memory (RAM), read-only memory (ROM), programmable read-only memory (PROM), Redundant Arrays of Independent Disks (RAID), flash memory, magneto-optical memory, holographic memory, bubble memory, magnetic drum, memory stick, Mylar® tape, smartdisk, thin film memory, zip drive, and so forth.

In addition, the system 10 includes a processor 16 configured to access the memory circuitry 14. The processor 16 is configured to pre-model the marketing data and to analyze pre-modeled marketing data using a sales and/or revenue based response model to identify contributory marketing-mix variables that affect the sales and/or revenue of the one or more products that will be described in a greater detail below.

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output.

It should also be noted that the phrase "configured to" as used herein means that the processor is equipped with a combination of hardware and software for performing the tasks of the invention, as will be understood by those skilled in the art.

In the illustrated embodiment, the processor 16 includes an application module 18 configured to assign each of the plurality of marketing-mix variables to one or more marketing-mix categories. The marketing-mix categories may be pre-defined by a user of the system 10 and may be dynamically updated to add new categories from time-to-time. For example, the variables may be separated into categorical, continuous and date variables. The variables may further be sub-categorized into specific marketing-mix categories such as macro-economic, promotional, media-related, seasonal categories, among others.

The application module 18 is further configured to analyze the marketing-mix variables using exploratory data analysis to generate the pre-modeled marketing data. The user of the system 10 may select the type of analysis to be performed. In one example embodiment, a univariate analysis may be performed using the marketing-mix variables. In particular, the univariate analysis is performed to estimate a range and frequency of values for a continuous variable. For example, univariate analysis may be performed to compare sales/revenue of a product from different stores.

In another example embodiment, bivariate analysis may be performed using the marketing-mix variables. Such bi-variate analysis is particularly advantageous to analyze relationship between any two variables in the dataset. For example, bivariate analysis may be performed to analyze relationship between sales of a product from stores and media advertisement rating of the respective stores.

In another example embodiment, a time series analysis may be performed to obtain a variation pattern of a variable across a pre-defined observation period. In one example embodiment, a similar time series pattern for two different variables indicates a direct relationship between the two variables. In certain other embodiments, a factor analysis may be performed to analyze the marketing-mix variables.

The processor 16 further includes an analytics module 20 configured to analyze the response model to determine individual contribution of each of the contributory marketing-mix variables towards the sales an/or revenue of the one or more products. In one example embodiment, the analytics module 20 is configured to transform and/or add one or more marketing-mix variables prior to generation of the sales and/or revenue model. The one or more marketing-mix variables may include an ad-stock variable, an event variable, a lead variable and a lag variable.

For example, the marketing strategies of products typically use advertisements through various communication channels to promote the products. It is known that advertisements have effects that are realized over time, though these effects also erode over a period of time. Typically, a new advertisement adds to the existing effect of an older advertisement to create "Ad-Stock". In this example embodiment, ad-stock variables corresponding to media and promotion variables are created prior to the modeling process. The ad-stock variables are ad-stocked at an appropriate decay rate to account for the carry-over effect of advertising. In one embodiment, Broadbent's decay effect model is employed to calculate the ad-stock for media variables.

In certain embodiments, mathematical operations may be performed on the variables by using a transformation functionality. For example, arithmetic transformation using mathematical operators like log, exponential and square root may be utilized to create new variables from the existing ones. In another embodiment, lagging/leading transformation may be performed to capture lag or lead effects coming from media activities and/or macroeconomic variables. Moreover, moving averages may be calculated to smoothen out short-term fluctuations in the data and determine long term trends or cycles. In yet another embodiment, event variables may be created to flag specific dates and time intervals where values of the dependent variables are expected to show variation/anomaly.

The analytics module 20 is further configured to generate a sales and/or revenue based response model to identify contributary marketing-mix variables that affect the sales and/or revenue of the one or more products. The response model is generated using a linear regression model, or a non-linear regression model, or a mixed model. The variable to be modeled is selected by the user of the system. For example, the variable may be total sales per a store or total revenue per a store, or sales/revenue over a period of time, among others.

In certain embodiments, the analytics module 20 provides the user with metrics related to performance of the model. For example, statistical metrics such as R squared, adjusted R squared, p value and variance inflation factor (VIF) may be estimated for the model. The analytics module 20 may also generate a variety of statistical plots. For example, residual plots may be generated to evaluate the effectiveness of the model.

The analytics module 20 is further configured to analyze the sales and/or revenue based response model to identify contributory marketing-mix variables that affect the sales and/or revenue of the one or more products. In one example embodiment, the analytics module 20 is configured to determine individual contribution of each of the contributory marketing-mix variables towards the sales an/or revenue of the one or more products. In another example embodiment, spends to the individual contribution of each of the contributory marketing-mix variables are compared.

Moreover, individual contributions of each of the contributory marketing-mix variables towards a change in sales over a pre-determined time period are estimated. In yet another embodiment, return of investment (ROI) for each of the contributory marketing-mix variables are determined. As will be appreciated by one skilled in the art, a variety of plots may be generated to evaluate the above described parameters. For example pie charts may be generated to compare individual contributions for each of the marketing-mix variables. Similarly, bar charts may be utilized to compare contribution versus spend for evaluating cost effectiveness of market strategies employed for promoting one or more products.

Moreover, the analytics module 20 is configured to generate a marketing-mix solution based at least upon the individual contribution of each of the contributory marketing-mix variables. In this embodiment, one or more marketing strategies contributing to overall sales and/or revenue of the one or more products are identified and a spend towards the identified marketing strategies are adjusted to generate the marketing-mix solution. In another example embodiment, the analytics module 20 is configured to forecast the sales and/or revenue of the one or more products based upon the marketing-mix solution. The forecast functionality enables a user to compare various scenarios and to make any required adjustment in marketing strategies of the products.

The processor 16 also includes an optimization module 22 configured to generate an optimal marketing-mix solution. The optimization module 22 is configured to support multi-layered optimization and may utilize techniques such as genetic algorithms, simulated annealing, particle swarm optimization and ant colony optimization. For example, the optimization module 22 may be utilized to optimize channel spends across different channels over a period of time. In this example embodiment, the optimization module 22 is an integral component of the system 10. In certain other embodiments, the optimization module 22 may be a separate component operating in parallel with the main system 10.

The optimization module 22 may include components such as an input layer that may be utilized to provide optimization inputs such as parameters to be optimized along with optimization constraints. Further, an optimization engine may be employed that includes optimization algorithms for accessing the user-provided inputs to optimize the desired parameters and provide the optimal marketing-mix solution through an output layer 24. Apart from providing the optimization results and relevant metadata, the output layer 24 also provides real-time tracking of the algorithm's progress.

The system 10 also includes a display module 26 to display the user-provided inputs regarding the marketing, required metrics from the analysis of the marketing data and the marketing-mix solution. Further, the system 10 may include a variety of software and hardware for formulating the problem statement. For example, the system 10 may include file servers, application servers, web servers, disk servers, database servers, transaction servers, telnet servers, proxy servers, list servers, groupware servers, File Transfer Protocol (FTP) servers, audio/video servers, LAN servers, DNS servers, firewalls, and so forth.

Figure 2:
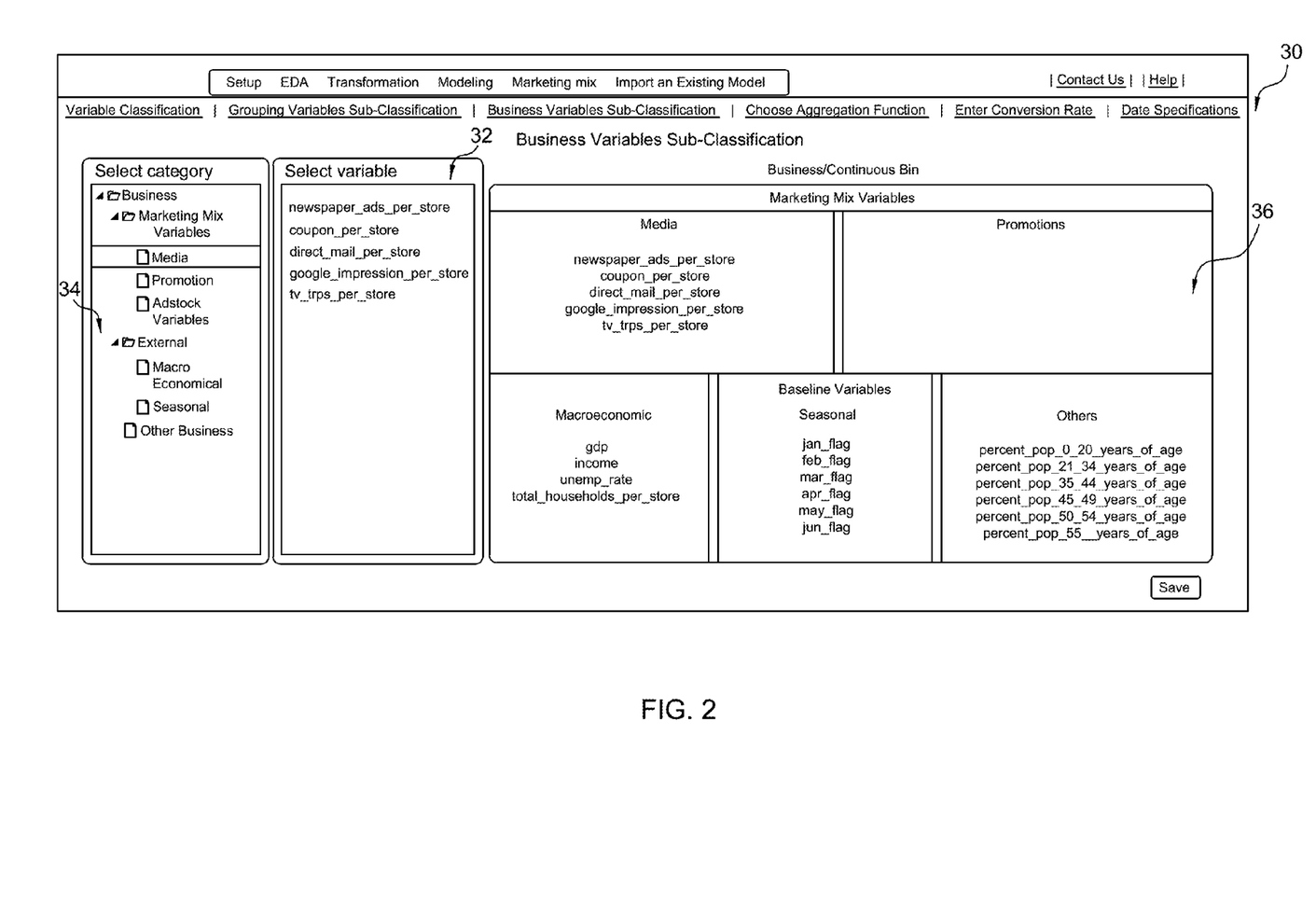
FIG. 2 shows an exemplary pre-modeling screen of the system of FIG. 1 in accordance with aspects of the present technique.

FIG. 2 shows an exemplary pre-modeling screen 30 of the system 10 of FIG. 1. The screen 30 provides the user interface for categorization of the marketing-mix variables. The system 10 provides secured access to the users by authenticating unique user names and corresponding passwords assigned to each user of the system 10. In the illustrated embodiment, the marketing data having a plurality of marketing-mix variables may be uploaded into the system either manually or by uploading in a file with a specified format. Separate user interfaces (not shown) may be utilized for access control and for uploading the marketing data into the system 10.

As can be seen, a plurality of marketing-mix variables such as displayed in cell 32 are assigned to marketing-mix categories such as displayed in cell 34. In this embodiment, the marketing-mix variables include variables such as number of newspaper advertisements per store, number of coupons per store, number of Google search impressions per store and television rating points (TRPs) per store. Moreover, the marketing-mix categories include business, external and so forth. The variables may be further sub-categorized into specific marketing-mix categories such as macro-economic, promotional, media-related, seasonal categories, among others The marketing-mix variables are separated from baseline variables and periodicity is specified for the time variables as shown in column 36. It should be noted that the user of the system 10 may dynamically create and update the marketing-mix categories.

Figure 3:
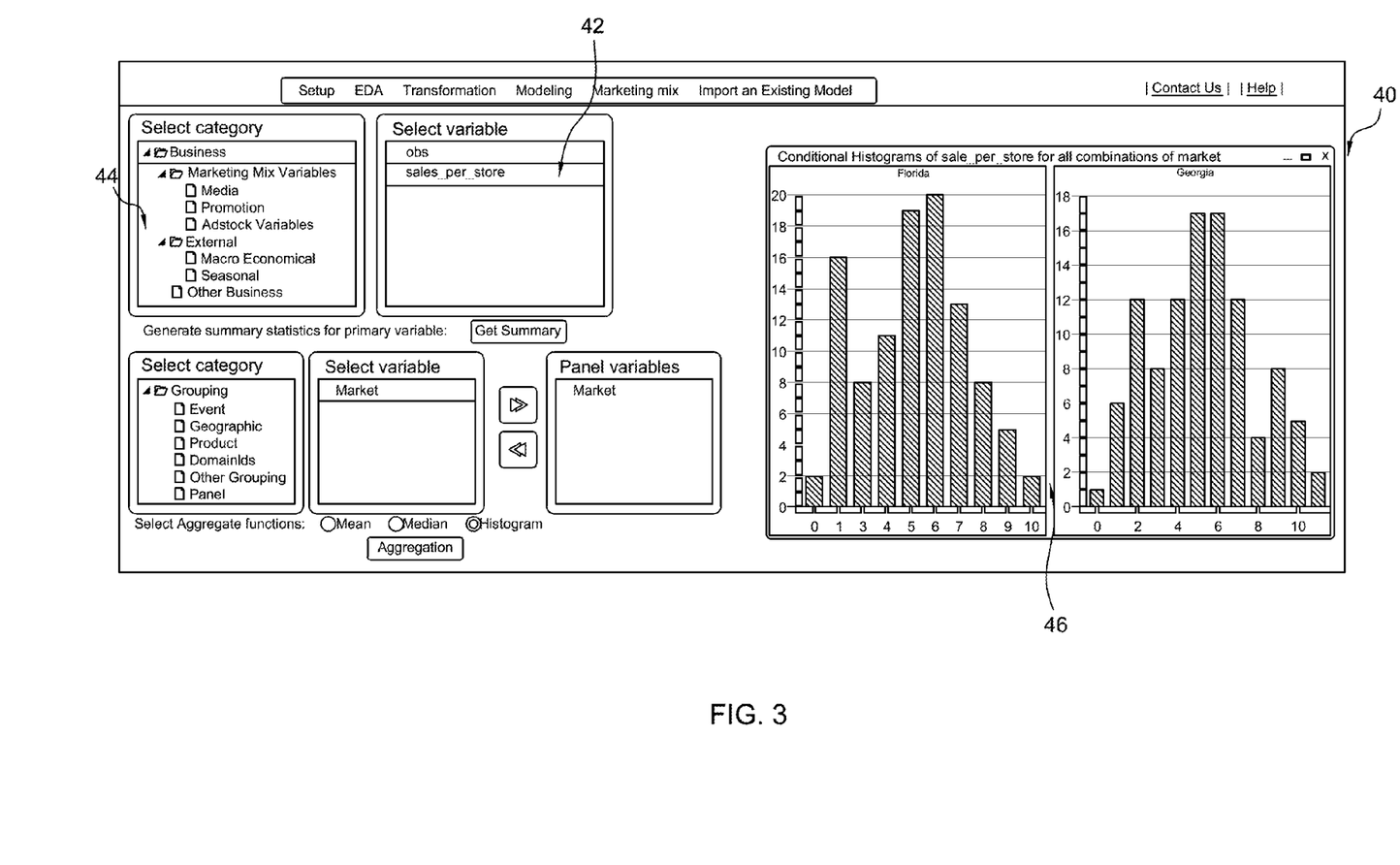
FIG. 3 shows another exemplary pre-modeling screen of a user-interface of the system in accordance with aspects of the present technique.

FIG. 3 shows another exemplary pre-modeling screen 40 of a user-interface of the system 10. The user interface 40 is accessed by the user for performing EDA using the marketing data. In this exemplary embodiment, variables may be selected from cell 42 from the marketing categories listed in cell 44 to generate plots such as conditional histograms shown in cell 46. In one example embodiment, univariate plots of continuous variables are generated. The application uses Sturges formula to determine bin sizes for the range of data in the univariate analysis. In certain other embodiments, bivariate and correlation plots are generated for selected dataset. In another embodiment, time series views at different time periods may be obtained for multiple variables at a time. In some other embodiments, factor analysis is utilized to group similar variables in the dataset. The screen 40 includes additional functionalities such as generating summary statistics for the variables, selecting aggregate functions etc.

Figure 4:
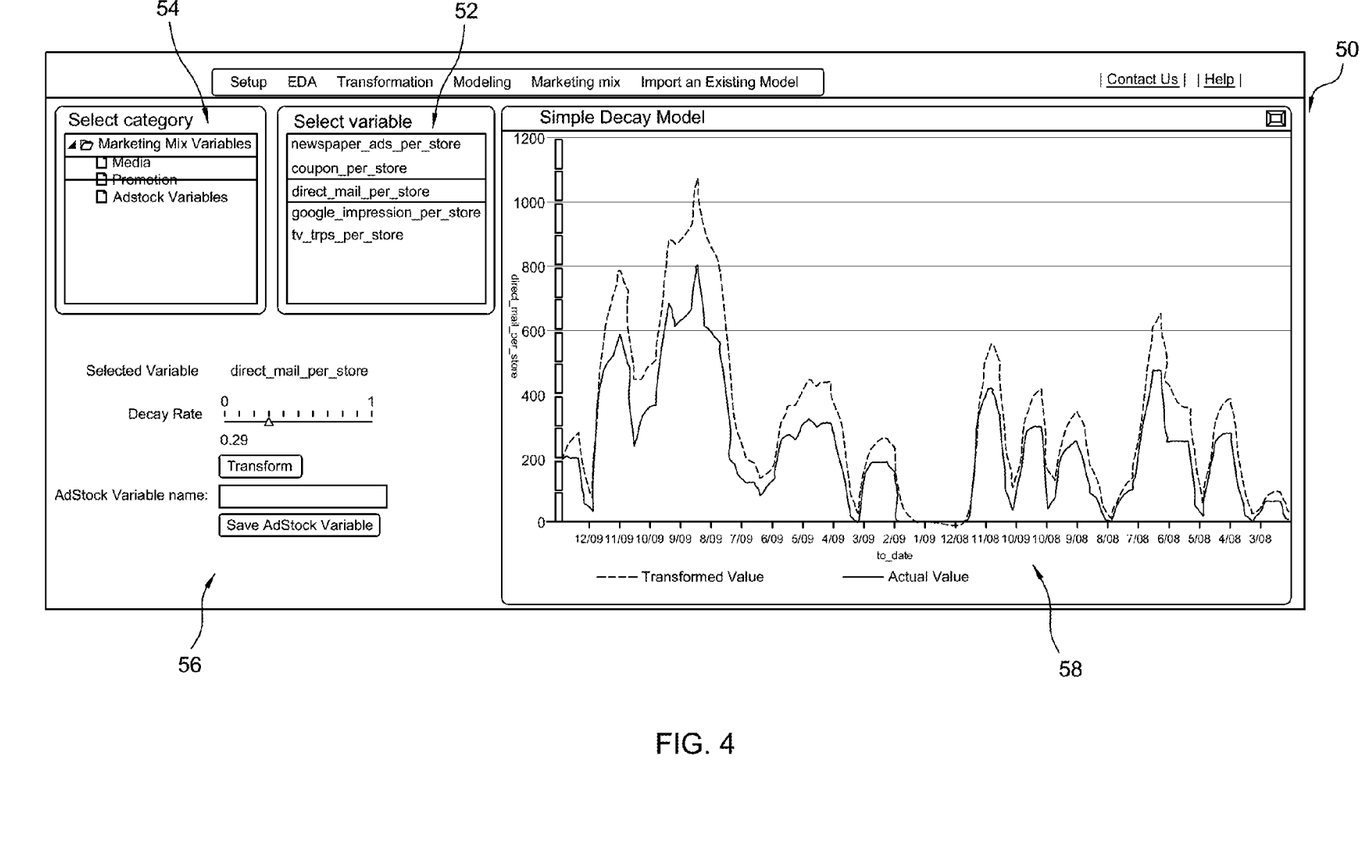
FIG. 4 shows an exemplary screen for creating marketing-mix variables such as ad-stock variables using the system of FIG. 1 in accordance with aspects of the present technique.

FIG. 4 shows an exemplary screen 50 for creating marketing-mix variables such as ad-stock variables using the system of FIG. 1. In the illustrated embodiment, the variables are selected from cell 52 from categories listed in cell 54. Moreover, the parameters such as decay rate, ad-stock variable name etc. are provided in cell 56 to create the ad-stock variables. Here, a plot of the transformed and the actual values of the variable is made available to the user, such as shown in cell 58. In this embodiment, Broadbent's model is employed to transform media and promotion data by considering a carry-over rate from prior promotional efforts. In certain other embodiments, new variables may be created through arithmetic, lag-lead or moving average transformations.

Figure 5:
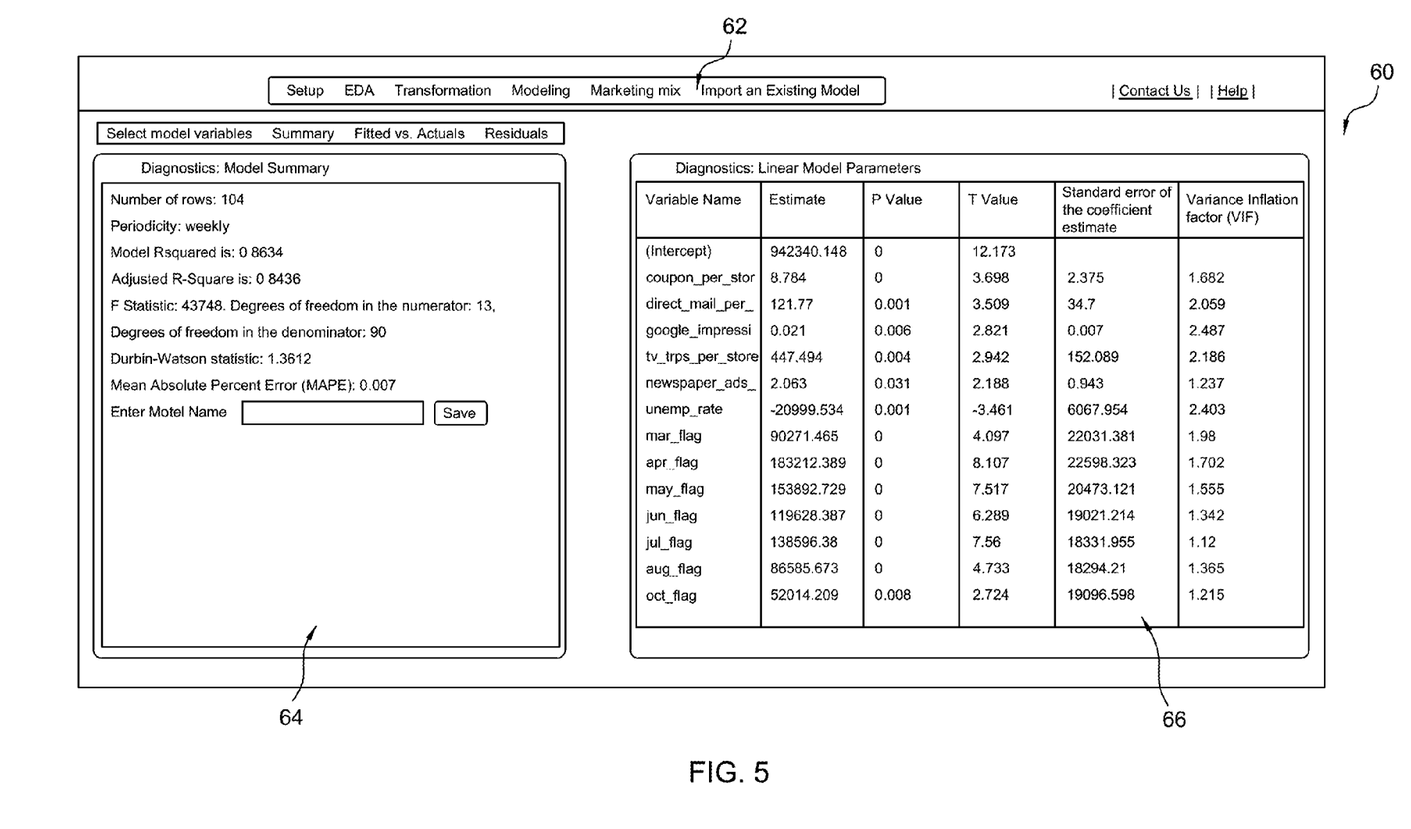
FIG. 5 shows an exemplary modeling screen of the system of FIG. 1 in accordance with aspects of the present technique.

FIG. 5 shows an exemplary modeling screen 60 of the system 10. In the illustrated embodiment, an appropriate modeling method may be selected depending on the type of marketing data to generate the sales/revenue based model. In one embodiment, a pre-existing model may be imported using an import option, as represented by reference numeral 62. As illustrated, summary of model output with estimated statistical parameters such as R-squared, MAPE, F-statistic, Durbin-Watson statistics, variable coefficients and so forth are provided to the users (as shown in cells 64 and 66). In one embodiment, fitted and actual values of the modeled parameter. In another embodiment, residuals may be plotted as a scatter plot. However, other plots/statistics may be generated to evaluate the model.

Figure 6:
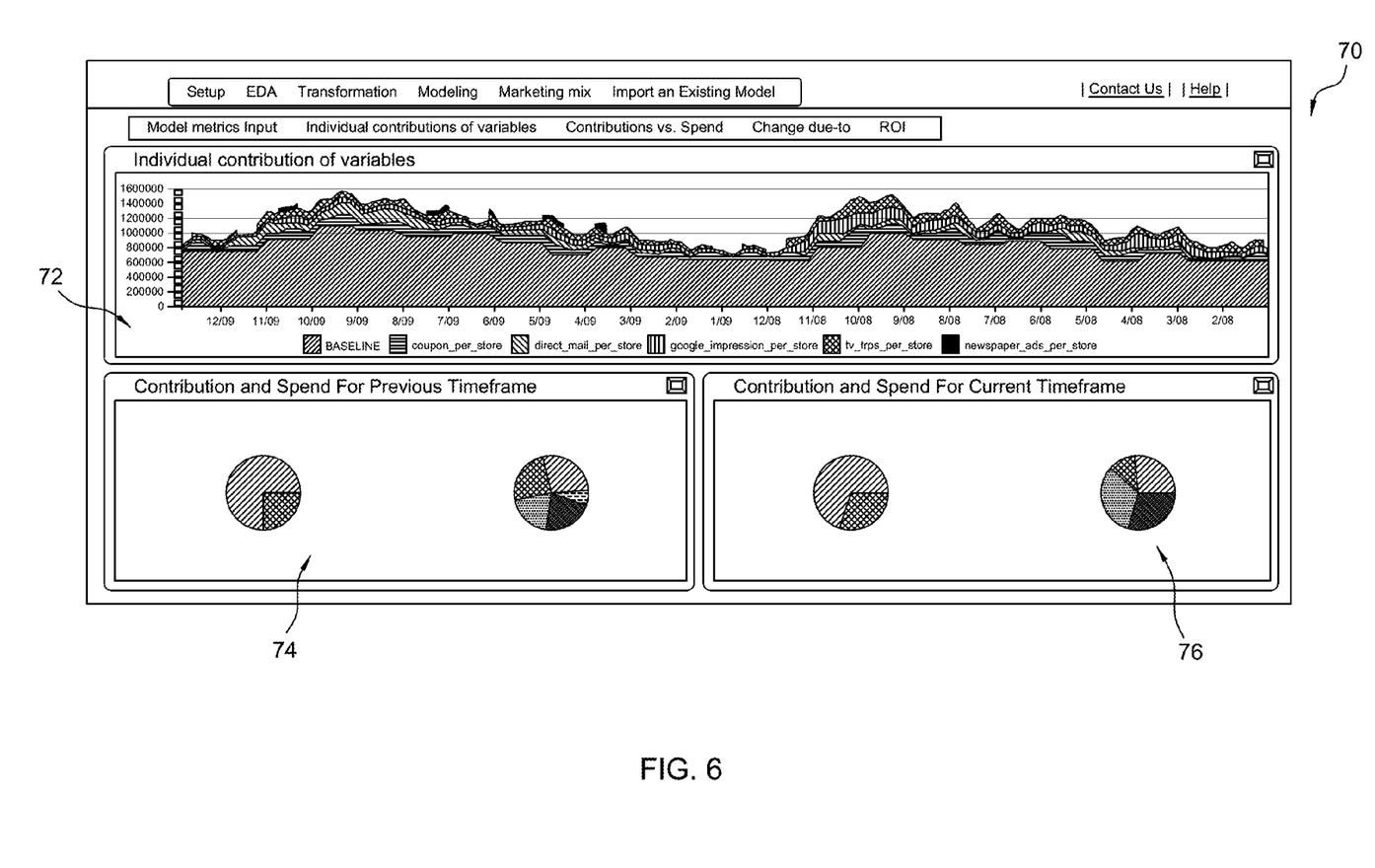
FIG. 6 shows an exemplary analysis output screen generated by the analytics module of the system of FIG. 1 in accordance with aspects of the present technique.

FIG. 6 shows an exemplary analysis output screen 70 generated by the analytics module 20 of the system 10 of FIG. 1. The analysis output screen 70 may display parameters such as the overall contribution of marketing to sales, the individual contribution of each marketing channel to sales, the return-on-investments (ROIs) for each channel etc. In the illustrated embodiment, individual contribution for each of the contributory marketing-mix variables is shown in plot 72. Moreover, contribution and spend data for the marketing-mix variables for a previous time frame and a current time frame are shown in cells 74 and 76 respectively.

Figure 7:
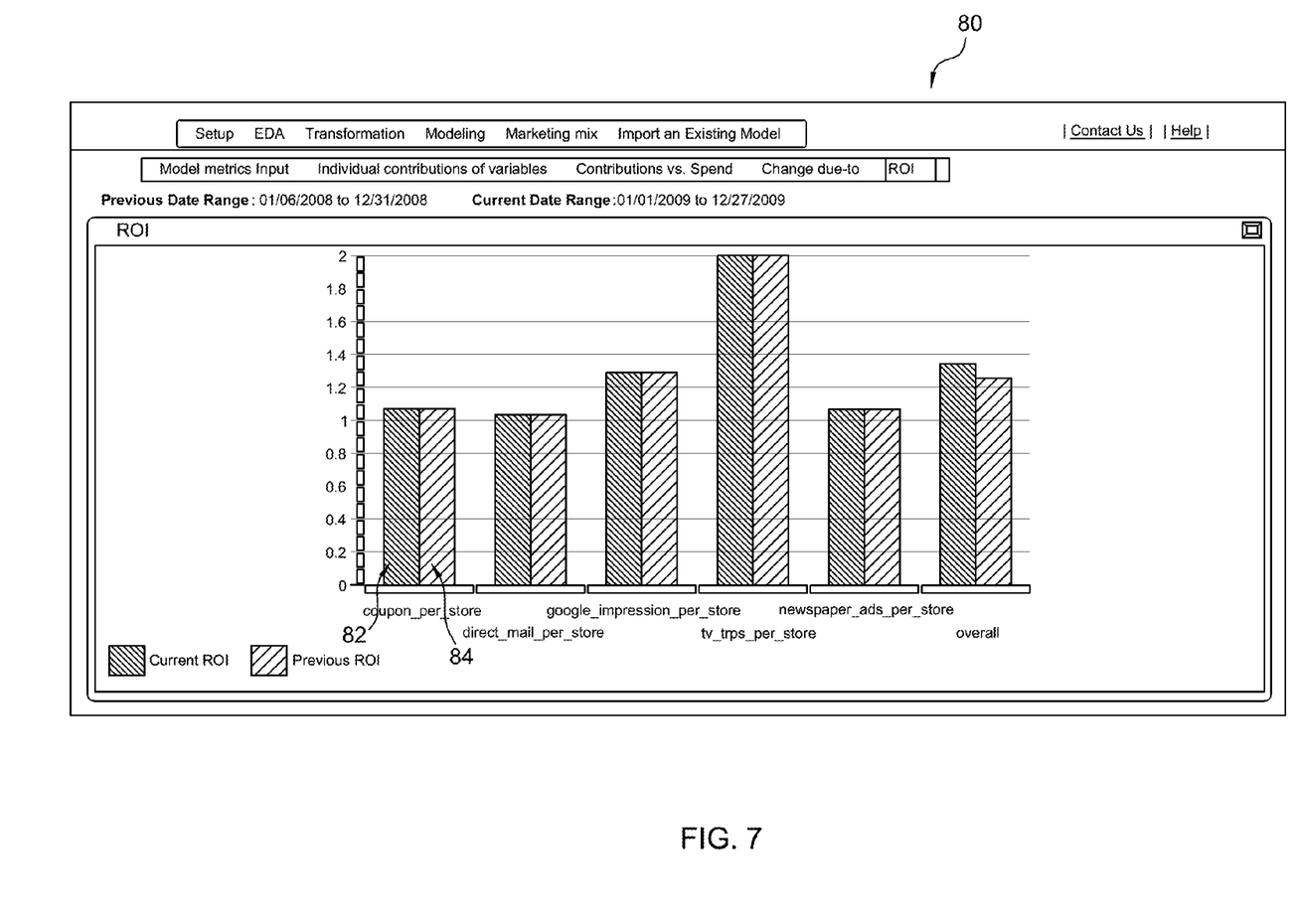
FIG. 7 shows another exemplary analysis output screen generated by the analytics module of the system of FIG. 1 in accordance with aspects of the present technique.

In another example embodiment, a graphical representation 80 of return of investment (ROI) for a previous time frame and a current time frame for a variety of marketing-mix variables is generated as shown in FIG. 7. As illustrated, the ROIs for the different time frames are represented by reference numerals 82 and 84. Advantageously, based on such data, marketing strategies may be adjusted to optimize spend by increasing budget on better ROI channels to improve returns.

Figure 8:
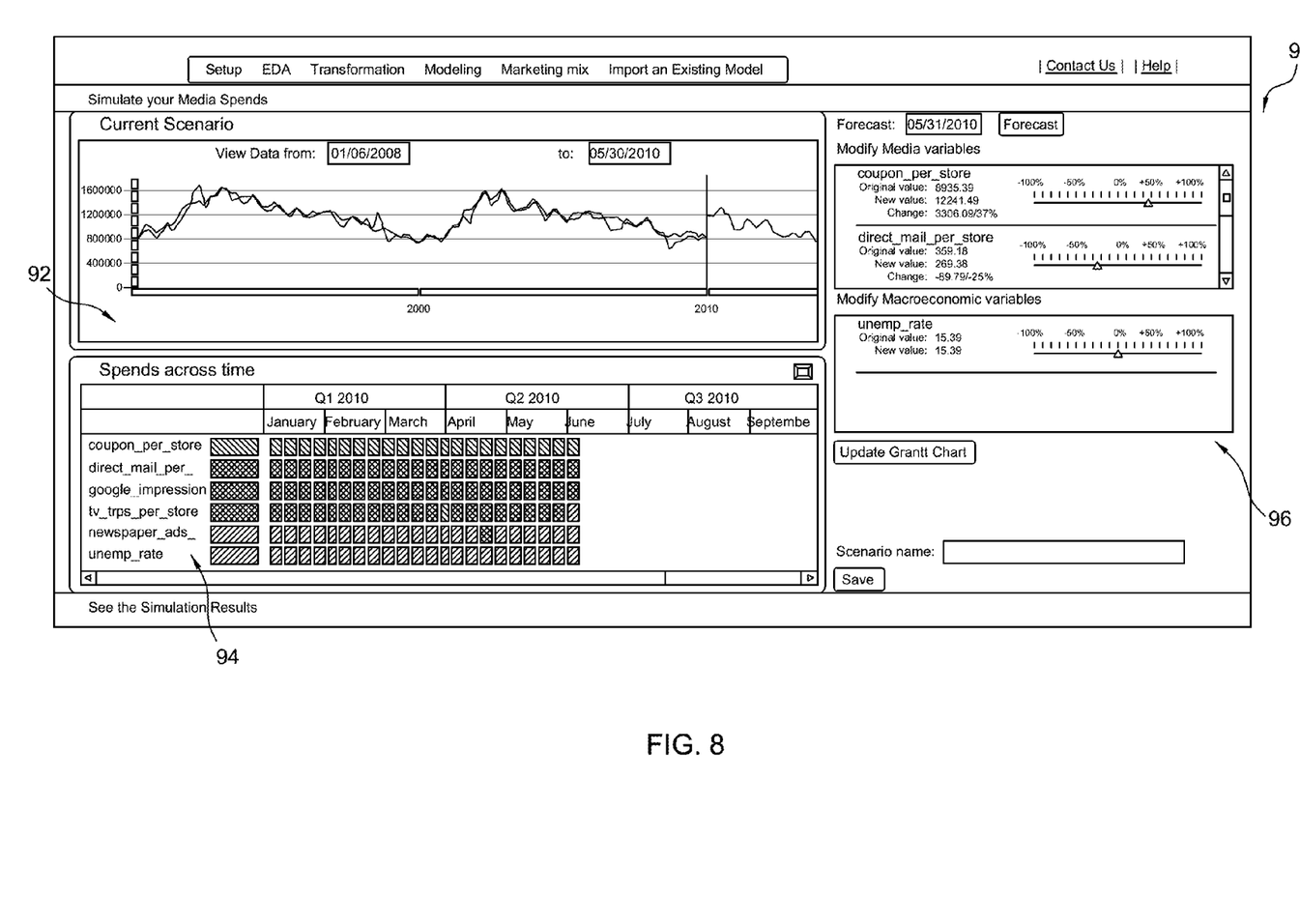
FIG. 8 shows an exemplary simulation output screen generated by the analytics module of the system of FIG. 1 in accordance with aspects of the present technique.

FIG. 8 shows another exemplary simulation output screen 90 generated by the analytics module 20 of the system 10 of FIG. 1. In the illustrated embodiment, a simulation is performed to forecast the sales and/or revenue of the one or more products based upon the marketing-mix solution. In the illustrated embodiment, marketing spends for a current scenario are graphical represented by chart 92. Moreover, spends corresponding to various marketing-mix variables are represented by chart 94. The simulation results obtained by modifying variables such as media variables, macroeconomic variables etc. are represented in cell 96. Thus, the effect of altering activities in a marketing segment can be observed using the simulation results as described above. Moreover, by executing different spend scenarios, the marketing activities that could potentially increase the over-all sales volume can be readily identified.

The example methods and systems described above enable generation of marketing-mix solution based upon a variety of factors such as macroeconomic situations, marketing channels, market conditions and so forth. In particular, the present technique enables pre-modeling of marketing data having a variety of marketing-mix variables that are associated with marketing strategies for one or more products and generating a sales and/or revenue based response model to identify contributory marketing-mix variables that affect the sales and/or revenue of the one or more products. The technique facilitates correlation of historical sales trends with marketing spend along with non-marketing factors to identify factors that drives sales of the products.

The technique further facilitates modeling effects of multiple factors including media, promotional and macro-economic factors and isolate effects of each campaign in multi-channel marketing to assess ROI and marginal return for each marketing activity. The methods and systems discussed herein utilize an efficient, robust and reliable technique for forming marketing strategies or adjusting existing marketing strategies for products in market by estimating the marketing effectiveness of current marketing activities and simulating future marketing scenarios.

The proposed system facilitates integration of analytics with marketing planning process and facilitates spend allocation and ROI optimization for different marketing channels. The system can accurately detect and respond promptly to changes in the market-place to create customized marketing solutions over the base platform to fit evolving business needs.

Figure 9:
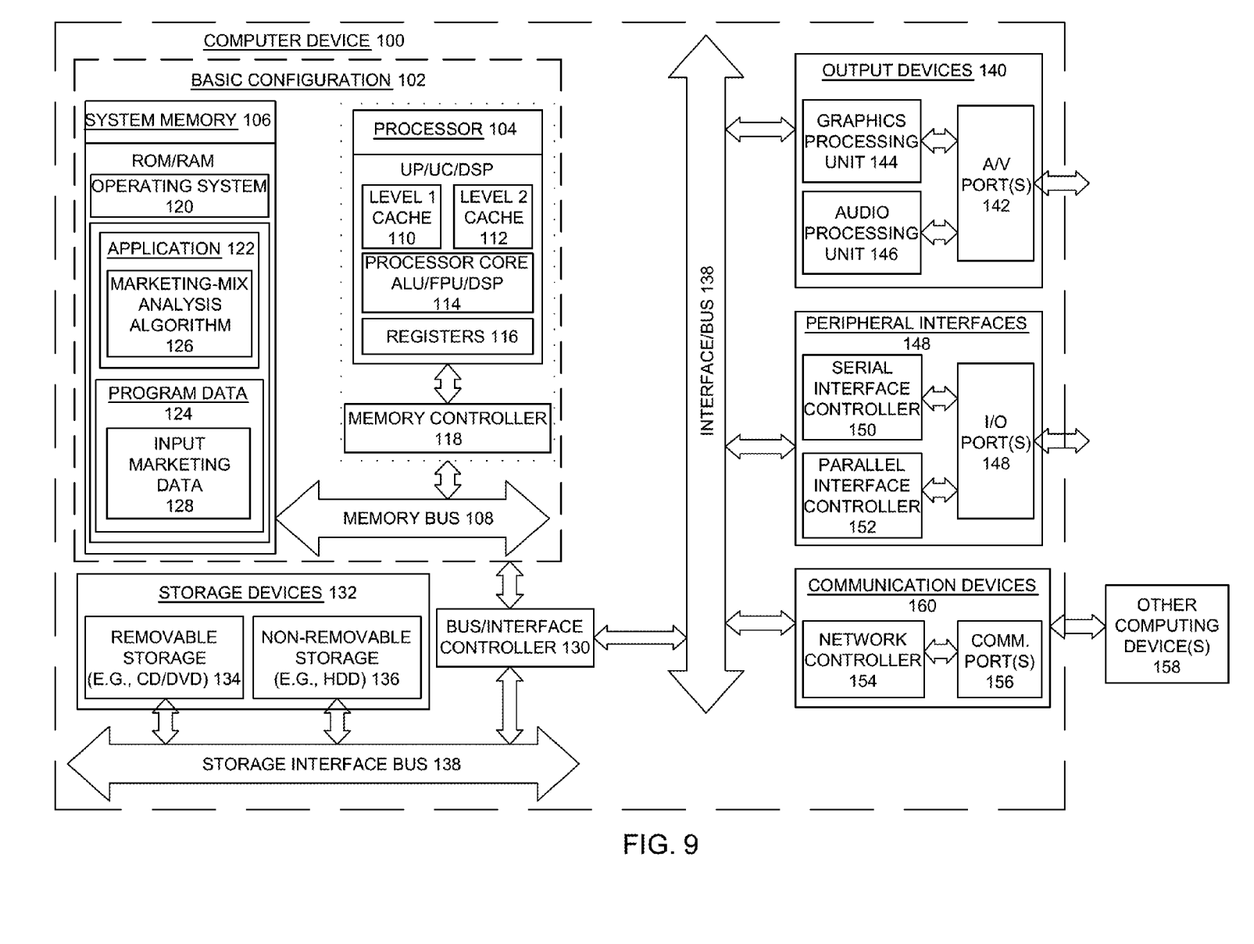
FIG. 9 is a block diagram illustrating an exemplary computing device that is arranged for generating a marketing-mix solution in accordance with aspects of the present technique.

FIG. 9 is a block diagram illustrating an example computing device 100 that is arranged for generating a marketing-mix solution in accordance with the present disclosure. In a very basic configuration 102, computing device 100 typically includes one or more processors 104 and a system memory 106. A memory bus 108 may be used for communicating between processor 104 and system memory 106.

Depending on the desired configuration, processor 104 may be of any type including but not limited to a microprocessor (µP), a microcontroller (µC), a digital signal processor (DSP), or any combination thereof. Processor 104 may include one more levels of caching, such as a level one cache 110 and a level two cache 112, a processor core 114, and registers 116. An example processor core 114 may include an arithmetic logic unit (ALU), a floating point unit (FPU), a digital signal processing core (DSP Core), or any combination thereof. An example memory controller 118 may also be used with processor 104, or in some implementations memory controller 118 may be an internal part of processor 104.

Depending on the desired configuration, system memory 106 may be of any type including but not limited to volatile memory (such as RAM), non-volatile memory (such as ROM, flash memory, etc.) or any combination thereof. System memory 106 may include an operating system 120, one or more applications 122, and program data 124. Application 122 may include a marketing-mix analysis algorithm 126 that is arranged to perform the functions as described herein including those described with respect to system 10 of FIG. 1. Program data 124 may include input marketing data 128 and analysis parameters as is described herein. In some embodiments, application 122 may be arranged to operate with program data 124 on operating system 120 such that analysis of market data and generation of marketing-mix solution may be performed. This described basic configuration 102 is illustrated in FIG. 9 by those components within the inner dashed line.

Computing device 100 may have additional features or functionality, and additional interfaces to facilitate communications between basic configuration 102 and any required devices and interfaces. For example, a bus/interface controller 130 may be used to facilitate communications between basic configuration 102 and one or more data storage devices 132 via a storage interface bus 134. Data storage devices 132 may be removable storage devices 136, non-removable storage devices 138, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 106, removable storage devices 136 and non-removable storage devices 138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 100. Any such computer storage media may be part of computing device 100.

Computing device 100 may also include an interface bus 140 for facilitating communication from various interface devices (e.g., output devices 142, peripheral interfaces 144, and communication devices 146) to basic configuration 102 via bus/interface controller 130. Example output devices 142 include a graphics processing unit 148 and an audio processing unit 150, which may be configured to communicate to various external devices such as a display or speakers via one or more A/V ports 152.

Example peripheral interfaces 144 include a serial interface controller 154 or a parallel interface controller 156, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 146 includes a network controller 160, which may be arranged to facilitate communications with one or more other computing devices 162 over a network communication link via one or more communication ports 164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 may also be implemented as a personal computer including both laptop computer and non-laptop computer configurations.

As will be appreciated by those of ordinary skill in the art, the foregoing example, demonstrations, and process steps may be implemented by suitable code on a processor-based system. It should also be noted that different implementations of the present technique may perform some or all of the steps described herein in different orders or substantially concurrently, that is, in parallel. Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
receiving, by a processor, a plurality of marketing-mix variables through a display, each of the plurality of marketing-mix variables being associated with marketing strategies for one or more products,
pre-modeling, by a processor, marketing data based on the received plurality of marketing-mix variables, the pre-modeling including,
analyzing, by a processor, the plurality of marketing mix variables by performing exploratory data analysis (EDA), the EDA being based on univariate analysis in which conditional histograms are generated using Sturges formula to determine bin sizes for a range of the marketing data,
generating, by a processor, at least one of a sales based response model and revenue based response model to identify contributory marketing-mix variables from among the plurality of marketing-mix variables that affect at least one of sales and revenue of the one or more products, and
analyzing, by a processor, the at least one of the sales based response model and the revenue based response model to determine individual contribution of each of the contributory marketing-mix variables towards at least one of the sales and the revenue of the one or more products;
receiving, by a processor, through the display one or more parameters to be optimized along with optimization constraints;
generating, by a processor, a new marketing-mix solution through multi-layered optimization using the determined individual contributions, the one or more parameters, and the optimization constraints, the multi-layered optimization being based on one or more algorithms selected from among at least one of genetic algorithms, simulated annealing, particle swarm optimization, and ant colony optimization; and
providing, by a processor, the new marketing-mix solution and a real-time tracking of the generation of the new marketing-mix solution, on the display.

2. The method of claim 1, wherein the pre-modeling the marketing data further includes assigning each of the plurality of marketing-mix variables to one or more marketing-mix categories.

3. The method of claim 2, wherein the EDA is further based on one of a bivariate analysis, a time series analysis, and a factor analysis.

4. The method of claim 1, wherein the generating at least one of the sales based response model and the revenue based response model comprises transforming or adding one or more of the plurality of marketing-mix variables to the response model.

5. The method of claim 4, wherein the one or more marketing-mix variables includes at least one of an ad-stock variable, an event variable, a lead variable, a lag variable, and combinations thereof.

6. The method of claim 4, wherein the at least one of the sales based response model and the revenue based response model is generated using at least one of a linear regression model, a non-linear regression model and a mixed model.

7. The method of claim 1, wherein the analyzing the at least one of the sales based response model and the revenue based response model further comprises comparing spends to the individual contribution of each of the contributory marketing-mix variables.

8. The method of claim 1, wherein the analyzing the at least one of the sales based response model and the revenue based response model further comprises determining the individual contribution of each of the contributory marketing-mix variables towards a change in sales over a time period.

9. The method of claim 1, wherein the analyzing the at least one of the sales based response model and the revenue based response model further comprises comparing return of investment(ROI) for each of the contributory marketing-mix variables.

10. The method of claim 9, further comprising:
forecasting the at least one of the sales and the revenue of the one or more products.

11. The method of claim 1, further comprising:
identifying one or more of the marketing strategies contributing to the at least one of the sales and the revenue of the one or more products.

12. A system comprising:
a user interface;
a memory having computer-readable instructions stored therein; and
a processor configured to execute the computer-readable instructions to,
receive a plurality of marketing-mix variables via the user interface, each of the plurality of marketing-mix variables being associated with marketing strategies for one or more products,
pre-model marketing data based on the received plurality of marketing-mix variables, by
analyzing the plurality of marketing mix variables by performing exploratory data analysis (EDA), the EDA being based on univariate analysis in which conditional histograms are generated using Sturges formula to determine bin sizes for a range of the marketing data,
generating at least one of a sales based response model and revenue based response model to identify contributory marketing-mix variables from among the plurality of marketing-mix variables that affect at least one of sales and revenue of the one or more products, and
analyzing the at least one of the sales based response model and the revenue based response model to determine individual contribution of each of the contributory marketing-mix variables towards at least one of the sales and the revenue of the one or more products,
receive via the user interface, one or more parameters to be optimized along with optimization constraints,
generate a new marketing-mix solution through multi-layered optimization using the determined individual contributions, the one or more parameters and the optimization constraint, the multi-layered optimization being based on one or more algorithms selected from among at least one of genetic algorithms, simulated annealing, particle swarm optimization, and ant colony optimization, and
provide the new marketing-mix solution and a real-time tracking of the generation of the new marketing-mix solution on the user display.

13. The system of claim 12, wherein the processor is further configured to assign the plurality of marketing-mix variables to one or more marketing-mix categories.

14. The system of claim 13, wherein the marketing-mix categories include at least one of a macro-economic category, a promotional category, a media-related category, a seasonal category, and combinations thereof.

15. The system of claim 12, wherein the processor is further configured to determine a contribution rating of each of the marketing strategies, an estimated spending on each of the marketing strategies and an estimated schedule for introduction of the marketing strategies into the market.

16. The system of claim 12, wherein the EDA is further based on one of a bivariate analysis, a time series analysis, and a factor analysis.

17. The system of claim 12, the one or more marketing-mix variables includes at least one of an ad-stock variable, an event variable, a lead variable, a lag variable, and combinations thereof.

18. The system of claim 12, wherein the processor is configured to analyze the at least one of the sales based response model and the revenue based response model by at least one of,
- comparing spends to the individual contribution of each of the contributory marketing-mix variables,
- determining the individual contribution of each of the contributory marketing-mix variables towards a change in sales over a time period, and
- comparing return of investment (ROI) for each of the contributory marketing-mix variables.

19. A non-transitory computer readable medium comprising computer-readable instructions, which when executed by a processor, cause the processor to perform functions including:
- receiving a plurality of marketing-mix variables through a display, each of the plurality of marketing-mix variables associated with marketing strategies for one or more products,
- pre-modeling marketing data based on the received plurality of marketing-mix variables, the pre-modeling including,
  - analyzing the plurality of marketing mix variables by performing exploratory data analysis (EDA), the EDA being based on univariate analysis in which conditional histograms are generated using Sturges formula to determine bin sizes for a range of the marketing data,
  - generating at least one of a sales based response model and revenue based response model to identify contributory marketing-mix variables from among the plurality of marketing-mix variables that affect at least one of sales and revenue of the one or more products, and
  - analyzing the at least one of the sales based response model and the revenue based response model to determine individual contribution of each of the contributory marketing-mix variables towards at least one of the sales and the revenue of the one or more products;
- receiving through the display one or more parameters to be optimized along with optimization constraints;
- generating, by a processor, a new marketing-mix solution through multi-layered optimization using the determined individual contributions, the one or more parameters, and the optimization constraints, the multi-layered optimization by based on one or more algorithms selected from among at least one of genetic algorithms, simulated annealing, particle swarm optimization, and ant colony optimization; and
- providing, by a processor, the new marketing-mix solution and a real-time tracking of the generation of the new marketing-mix solution on the display.

20. The method of claim 19, wherein the EDA is further based on one of a bivariate analysis, a time series analysis, and a factor analysis.

* * * * *